US005851700A

United States Patent [19]

Honda et al.

[11] Patent Number: 5,851,700

[45] Date of Patent: Dec. 22, 1998

[54] FILTER FOR LIQUID CRYSTAL DISPLAY DEVICE

[75] Inventors: Masaru Honda; Shigeo Hozumi, both of Ibaraki; Shinichiro Kitayama, Osaka, all of Japan

[73] Assignee: Sumitomo Chemical Company, Limited, Osaka, Japan

[21] Appl. No.: 808,343

[22] PCT Filed: Aug. 25, 1994

[86] PCT No.: PCT/JP94/01404

§ 371 Date: Jun. 2, 1995

§ 102(e) Date: Jun. 2, 1995

[87] PCT Pub. No.: WO95/06267

PCT Pub. Date: Mar. 2, 1995

Related U.S. Application Data

[63] Continuation of Ser. No. 432,177, Jun. 2, 1995, abandoned.

[30] Foreign Application Priority Data

Aug. 25, 1993 [JP] Japan .................................... 5-210512
Jan. 17, 1994 [JP] Japan .................................... 6-003236

[51] Int. Cl.[6] ............................ G03H 1/04; C09K 19/00; G02B 5/02

[52] U.S. Cl. .......................... 430/2; 430/1; 430/6; 430/7; 430/20; 522/96; 522/97; 522/182; 359/599; 359/504

[58] Field of Search ................................. 430/1, 2, 20, 6, 430/7; 522/96, 97, 182; 359/507, 599, 707

[56] References Cited

U.S. PATENT DOCUMENTS 5,108,857 4/1992 Kitayama et al. .......................... 430/4
5,112,722 5/1992 Tsujino et al. .......................... 430/290
5,153,260 10/1992 Ueda et al. ............................ 524/847
5,453,340 9/1995 Kawabata et al. ...................... 430/290
5,516,456 5/1996 Shinohara et al. .......................... 428/1

FOREIGN PATENT DOCUMENTS 0272582 6/1988 European Pat. Off. .
5-232460 9/1993 Japan .

OTHER PUBLICATIONS

"Xerox Disclosure Journal", XP 002040757, vol. 5, No. 5, Sep./Oct. 1980, pp. 561–562.

*Electronic Technology (Denshi Gijutsu)*, 1992–6, pp. 49–52 "Polymer Dispersed LCD Begins . . . " (partial translation).

*Nikkei Materials & Technology*, 93/12 (No. 136), pp. 43–45 (partial translation).

Multi Domain Pixel Structures and Their Improvement for Angular Dependency, Ken Sumiyoshi, Dec. 15, 1993 (translation).

*Primary Examiner*—Susan W. Berman
*Attorney, Agent, or Firm*—Birch, Stewart, Kolasch & Birch, LLP

[57] ABSTRACT

A filter for a liquid crystal display device, having a light diffusing plate which is obtained by forming a composition in the form of a film which contains at least two photopolymerizable oligomers or monomers having refractive indexes which differ from each other by at least 0.01 and irradiating UV light on the composition. When the filter is fitted to a light emitting side of a liquid crystal display device, an angle of view of the liquid crystal display face plane is widened, shadows due to opaque parts of the device are reduced, and a Moiré fringe is hardly formed.

13 Claims, 4 Drawing Sheets

1 2 3 4 5 6 7 14

Viewer

FILTER FOR LIQUID CRYSTAL DISPLAY DEVICE

This application is a continuation of application Ser. No. 08/432,177 filed on Jun. 2, 1995, now abandoned.

FIELD OF THE INVENTION

The present invention relates to a filter for a liquid crystal display device, which will widen an angle of view and suppress the decrease in picture quality caused by opaque parts of the device, when the filter is fitted to the liquid crystal display device.

DESCRIPTION OF CONVENTIONAL ART

In these times, a liquid crystal display device is expected to be a display device which can compete with a cathode ray tube (CRT), because of its characteristics such as its thinness, light weight and high picture quality. The modes of the liquid crystal display device which, have been developed include twisted nematic (TN) a type, a super twisted nematic (STN) type, a ferroelectric type and a polymer dispersion type. Liquid crystal display devices with multicolor and high definition are commercially sold.

With the demand for a large area display and development of a high-vision technique, an enlarging projection type display device is becoming desired. In addition, with the increase of processing speed in computers, a virtual reality display device has been developed which displays an image as if it were actually present, using a liquid crystal display device as a display device which is worn on a head like a goggles.

Most of the liquid crystal display devices mainly use the TN or STN addressing mode. Such an addressing mode has a drawback in that the angle of view in which the image has satisfactory quality is narrow since, when a displayed image is seen from an upper or lower angle and/or a right or left side angle, brightness and contrast of the image are considerably deteriorated. This characteristic of the angle of view has been studied for a long time to improve it.

As one of the methods for the improvement of the above drawback, a method for correcting a pretilt angle of the liquid crystal molecule using an orientation separating technique has been studied. However, since this method makes the production step complicated, a large increase of production cost is unavoidable.

As a simple method, there is known a method for diffusing light in a wide angle range by providing a diffusing sheet on the liquid crystal display panel. Since the transmission of the diffusing sheet is usually 80% or less, the brightness of the liquid crystal display face plane is decreased. The effect of enlarging the angle of view becomes larger as the angular distribution of light to be diffused by the diffusing sheet becomes wider. However, a currently used diffusing sheet has a narrow light diffusing angle, and a sheet having a wide diffusing angle is sought.

A liquid crystal display device based on another addressing mode is under development, and does not exhibit commercially sufficient performance.

In the liquid crystal display device, opaque parts such as a bus electrode or a thin film electrode (TFT) are provided around pixels. In the case of a display device which enlarges the image of the liquid crystal display device such as the liquid crystal projector or the virtual reality display device, since the opaque parts form shadows on a displayed picture which is enlarged and projected, the image quality is considerably deteriorated.

To cope with this problem, Japanese Patent KOKAI Publication Nos. 232460/1993 and 273540/1993 propose the provision of a phase lattice on a substrate of a transmission type liquid crystal display device, which is on the light emitting side. This proposal suppresses the decrease of image quality by bending a light beam which passes through a pixel of the liquid crystal display device by a light diffraction effect of the phase lattice to shift the light beam to the shadow formed by the opaque part. As the phase lattice, there are exemplified a shape modulation type phase lattice which can be produced by a photolithography method and a refractive index modulation type phase lattice which is prepared by distributing a monomer having a different refractive index in the resin and polymerizing. Since the phase lattice easily generates Moiré fringes due to its regular structure, the accuracy during the production of the phase lattice should be high.

SUMMARY OF THE INVENTION

An object of the present invention is to provide a filter which can widen an angle of view of a liquid crystal display device, and decrease the shadow area caused by opaque parts of the device, suffers less from the generation of the Moiré fringes when it is fitted to a light emitting side of the liquid crystal display device, and is easily produced.

As a result of an extensive study, it has been found that the above object is achieved by providing a filter comprising a light diffusing plate which is prepared by forming a specific photopolymerizable composition in the form of a film and irradiating an ultraviolet (UV) light on the film-shaped composition, and the present invention has been completed.

Accordingly, the present invention provides a filter for a liquid crystal display device, comprising a light diffusing plate which is obtained by forming a composition which comprises at least two photopolymerizable oligomers or monomers having refractive indexes which differ from each other by at least 0.01 in the form of a film and irradiating a UV light on said film-shaped composition.

DETAILED DESCRIPTION OF THE INVENTION

Figure 1:
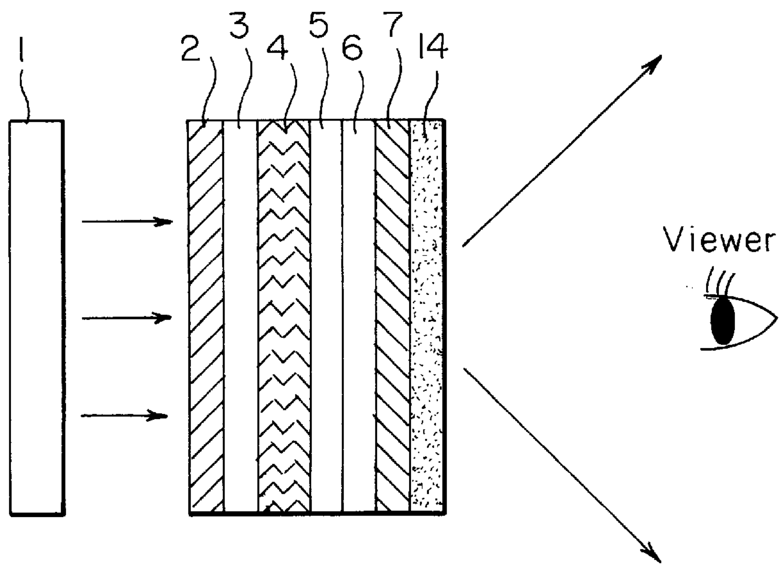
FIG. 1 is a cross sectional view showing a structure of a TFT addressed direct vision type liquid crystal display device to which an example of the filter for the liquid crystal display device according to the present invention is fitted.

In the present invention, at least two photopolymerizable oligomers and/or monomers are used having diffraction indexes which differ from each other.

Examples of combinations are two monomers include: one monomer and one oligomer, two oligomers, and the combination obtained by further adding at least one monomer or oligomer to the combinations above.

In each combination, the difference of diffractive index between at least two components is at least 0.01. Preferably, at least one component thereof has at least two photopolymerizable functional groups.

A specific example of the combination of the photopolymerizable monomers or oligomers is the combination of at least one component selected from the group consisting of monomers such as 2,4,6-tribromophenyl acrylate, tribromophenoxyethyl acrylate, nonylphenoxyethyl acrylate, 2-hydroxy-3-phenoxypropyl acrylate, phenylcarbitol acrylate, phenoxyethyl acrylate, etc. and oligomers such as ethylene oxide-modified bisphenol-A diepoxy acrylate, etc., and at least one component selected from the group consisting of monomers such as triethylene glycol diacrylate, polyethylene glycol diacrylate, neopentyl glycol diacrylate, 1,6-hexanediol diacrylate, etc. and oligomers such as polyol polyacrylate, modified polyol polyacrylate, polybutadiene acrylate, polyether urethane acrylate, etc.

The monomers or oligomers are not limited to the above exemplified compounds. Any other photopolymerizable monomers or oligomers may be used as long as at least two monomers or oligomers to be used in combination have refractive indexes which differ from each other by 0.01 or larger.

The ratio of the two photopolymerizable monomers or oligomers having different refractive indexes is in a range of from 9:1 to 1:9 in terms of a weight ratio of the higher refractive index compound to the lower refractive index compound.

A composition comprising the photopolymerizable monomers or oligomers according to the present invention preferably contains a conventional photopolymerization initiator to increase its curing property. Examples of the photopolymerization initiator are benzophenone, benzil, Michler's ketones, 2-chlorothioxanthone, 2,4-dietylthioxanthone, benzoin ethyl ether, diethoxyacetophenone, benzyldimetylketal, 2-hydroxy-2-methylpropiophenone, 1-hydroxycyclohexyl phenyl ketone, and so on.

To the composition comprising the photopolymerizable monomers or oligomers according to the present invention, a filler having an average particle size of 0.05 to 20 μm may be added in an amount of 0.01 to 5 parts by weight, or a UV light absorber may be added.

As the filler, polymethyl methacrylate, polyethylene, polystyrene and silica are exemplified.

In the present invention, the composition comprising the photopolymerizable monomers or oligomers is formed in a film-shape, by, for example, coating the composition on a substrate or filling it in a cell. Then, the UV light is irradiated on the film-shaped composition to obtain the light diffusing plate.

As a light source to be used in the photopolymerization, any light source may be used as long as it can emit light which contributes to the photopolymerization. A lamp which emits a UV light beam is one of preferred light sources. The shape of the light source is selected according to the view angle characteristics of the liquid crystal display device to which the filter comprising the light diffusing plate according to the present invention is fitted, and the purpose of the use of the filter.

When the view angle characteristics of the liquid crystal display device to which the filter is fitted are insufficient in upper and lower directions and right and left directions of the face plane and the angle of view should be improved in all directions, or when the use of the filter is intended to decrease the shadows caused by the opaque parts of the liquid crystal display device, preferably the light is diffused equally in all directions by the light diffusing plate. In such a case, as when the UV light is to be irradiated in the photopolymerization step, parallel light rays such as sun light are most preferably used, while a spherical or box-shaped light source or a rod-shaped light source having a ratio of a long axis to a short axis of 2:1 or less may provide the same performance.

When the view angle characteristics of the liquid crystal display device to which the filter is fitted are sufficient in the right and left directions but insufficient in the upper and lower directions of the face plane and the angle of view should be improved in the upper and lower directions, the light is diffused preferably in the upper and lower directions by the light diffusing plate, in view of the effective utilization of the emitted light from the liquid crystal display device. In such a case, when the UV light is irradiated from a linear or rod-shaped light source to photopolymerize and cure the film-shaped composition, a filter comprising a light diffusing plate with directional properties of light diffusion can be obtained. The angle of view can be widened by arranging the light diffusing direction of the filter in a direction in which the angle of view of the liquid crystal display device is desired to be improved.

A selective diffusing property of the light diffusing plate in relation to the incident angle of light is defined by a haze of the plate in relation to the incident angle of light. Preferably, the light diffusing plate used in the present invention has a property of changing the haze depending on the incident angle of light, and both a light incident angle range with a light diffusing ability of a haze of at least 30% (a diffusing angle range) and other light incident angle range without a light diffusing ability. When the maximum haze in the diffusing angle range is less than 30%, an effect of enlarging the angle of view is insufficient. When this maximum haze exceeds 85 %, the image may blur. Then, the maximum haze of the light diffusing plate is preferably in the range between 30% and 85%.

The thickness of the filter comprising the light diffusing plate of the present invention is not limited. To achieve the light diffusing ability, the thickness of the filter is at least 10 μm, preferably from 50 to 300 μm.

The filter comprising the light diffusing plate of the present invention is produced by utilizing a property of the composition comprising the specific photopolymerizable monomers or oligomers that they are photopolymerized and cured while causing a phase separation by the irradiation of the UV light. This method can produce the filter comprising a refractive index modulating type smooth light diffusing plate having a domain gap of 1 to 20 μm, without the use of a mask during the UV light irradiation. Since the separated phases have a continuous interface between them, no light is reflected at the interface when light passes through the obtained filter, so that the light transmission is not decreased. Since this filter does not have a structure with regularity unlike the phase lattice, it does not form any Moiré fringe. In addition, the production step uses no mask but includes only the UV light irradiation on the film-form composition, the production process is simple and suitable for mass production.

When the filter comprising the light diffusing plate of the present invention is fitted to the light emitting side of the liquid crystal display device, it is preferably assembled in a laminate by inserting it between the outer surface of the device and a transparent substrate.

As the transparent substrate to be used in the laminate, any transparent substrate can be used. Examples are polycarbonate resins, methacrylic resins, polyethylene terephthalate (PET) resins, polystyrene resins, or transparent glass. An outer surface of the transparent substrate may be treated by at least one treating method selected from low reflecting treatment, glare proofing treatment and hard coat treatment. A method for laminating the transparent substrate and the light diffusing plate is not limited, and may be any of conventional methods.

When the filter comprising the light diffusing plate is fitted to the light emitting side of the liquid crystal display device, preferably it is contacted to the face plane as closely as possible. In this step, a polarizing plate which is used outside the liquid crystal panel can be integrated with the light diffusing plate to adhere the light diffusing plate directly to the liquid crystal display device.

As the liquid crystal used in the liquid crystal display device to which the filter comprising the light diffusing plate of the present invention is preferably fitted, and an addressing system of the device, any system such as a passive-matrix-addressed system using TN and STN liquid crystals, and a TFT type active-matrix-addressed system using a TN liquid crystal may be used.

Figure 2:
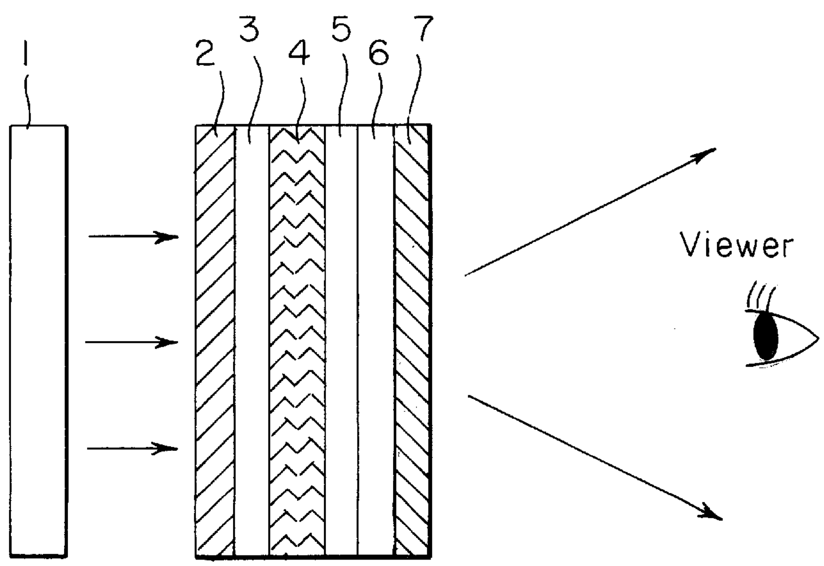
FIG. 2 is a cross sectional view showing a structure of a conventional TFT addressed direct vision type liquid crystal display device.

As an example, FIG. 2 shows a structure of a TFT addressed direct vision type liquid crystal display device. In the case of the direct vision type liquid crystal display device, a light beam emitted from a back light 1 passes through a polarizing plate 2, a TFT substrate 3, a liquid crystal cell 4, a color filter 5, a counter substrate 6 and a polarizing plate 7 and reaches eyes of a viewer. In the case of the TFT addressed liquid crystal display device, a TN mode is often used. In the TN mode, since a twisting angle of the liquid crystal is 90 degrees, an angle of view is only about 60 degrees.

Figure 3:
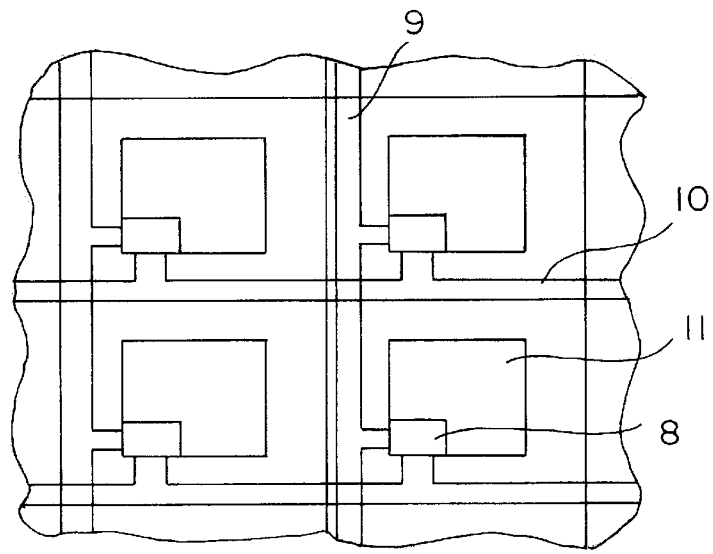
FIG. 3 is a plan view of a TFT substrate

FIG. 3 shows an example of a TFT substrate. On the TFT substrate, TFT devices 8, source bus electrode 9 which supply a voltage to the TFT devices, and gate bus electrodes 10 are arranged. In FIG. 3, 11 stands for a pixel electrode.

Figure 4:
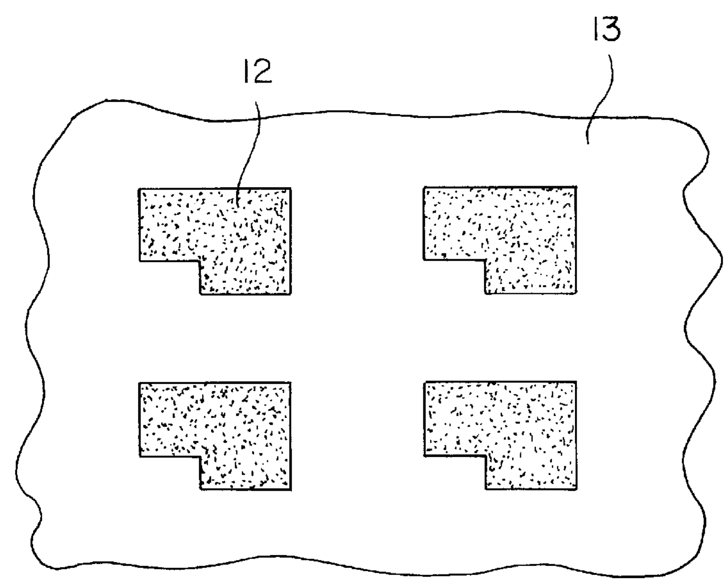
FIG. 4 is a plan view of a color filter.

FIG. 4 shows an example of a color filter. On the color filter, pixels 12 which develop a color on the liquid crystal display device, and a shielding part 13 (black matrix) which prevents light leakage between the pixels and suppresses reflection of external light on the TFT devices and the bus electrodes are patterned. Then, the light beam emitted from the back light is intercepted by the opaque parts such as the TFT devices 8, the bus electrodes 9, 10, the shielding part 13, and the like, whereby the image is roughened.

FIG. 1 shows a structure of a direct vision type liquid crystal display device, in which a filter 14 comprising the light diffusing plate of the present invention is fitted to a light emitting side of the polarizing plate 7 present on the viewer side.

In the case of a liquid crystal projector, a light source lamp is used in place of the back light 1 of FIG. 1 and a projector screen is placed at a position of the viewer.

EXAMPLES

The present invention will be illustrated by the following Examples, which do not limit the scope of the present invention in any way.

The upper and lower direction angles used in the Examples are intended to mean upper and lower direction angles, respectively from a normal line to a face plane of a liquid crystal television set used in the Examples.

In the Examples, "parts" are by weight.

Example 1

To a polyether urethane acrylate having an average molecular weight of about 6000 (a refractive index of 1.460) (40 parts) which was obtained by the reaction of polypropylene glycol, hexamethylene diisocyanate and 2-hydroxyethyl acrylate, 2,4,6-tribromophenyl acrylate (a refractive index of 1.576) (30 parts), 2-hydroxy-3-phenoxypropyl acrylate (a refractive index of 1.526) (30 parts), and 2-hydroxy-2-methylpropiophenone (1.5 parts) as a photopolymerization initiator were added and mixed to prepare a photopolymerizable composition.

The composition was coated on a glass plate to a thickness of about 130 $\mu$m to form a film-form photopolymerizable composition. This film and the glass plate were passed through a conveyor type UV light irradiating apparatus having a lamp aperture of 5 cm×5 cm, a lamp power of 120 W/cm, and a conveyor speed of 0.4 m/min. to photopolymerize the composition. Thereby, a filter comprising a light diffusing plate for a liquid crystal display device was produced.

Figure 5:
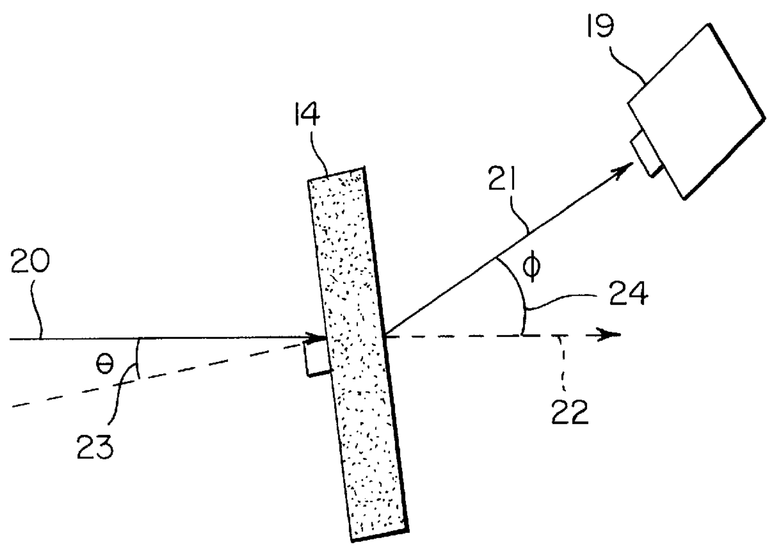
FIG. 5 is a schematic view showing a method for measuring an angular distribution of diffused light through a filter for a liquid crystal display device.

An angular distribution of light intensity diffused by the filter for the liquid crystal display device was measured with an apparatus for measuring an angular distribution of diffused light intensity (manufactured by Shimadzu Corporation). FIG. 5 schematically shows this apparatus. A light beam 20, which is irradiated on the filter 14 for the liquid crystal display device at an incident angle 23 ($\theta$) from a normal line direction to the filter 14, is diffused by the filter 14 and emitted at an angle 24 ($\phi$). When the angular distribution of the diffused light 21 is measured by a light intensity detector 19, the light diffusion characteristics of the filter for the liquid crystal display device is measured.

Figure 6:
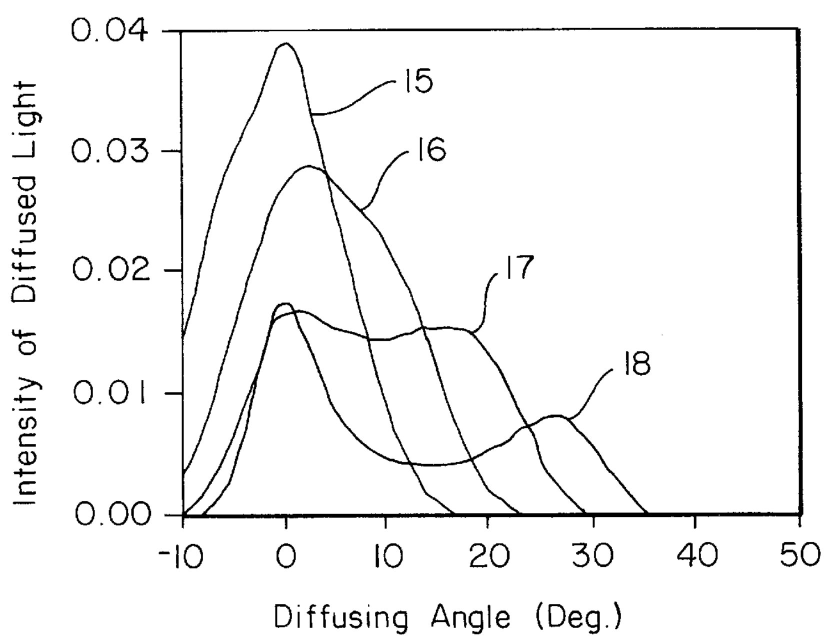
FIG. 6 is a graph showing angular distributions of intensity of diffused light of a filter for a liquid crystal display device.

FIG. 6 shows the light diffusion characteristics when light of 550 nm was irradiated on the filter for the liquid crystal display device according to the present invention. The distribution curves 15 to 18 are the intensity distributions of diffused light at incident angles of 0, 5, 10 and 15 degrees, respectively.

The diffusion angle $\phi$ is 0 degree on a direction 22 of a light beam which propagates straight in relation to the incident light, and regarded as a positive angle when the light beam is emitted on a side including the normal line.

The incident light in the normal line direction to the filter for the liquid crystal display device provides an angular distribution of the diffused light intensity which is an Gaussian distribution having a half width of about 8 degrees, as shown by the distribution curve 15. In contrast, the incident light irradiated from a direction at an angle of 15 degree from the normal line provides the angular distribution of the diffused light intensity having the maximum around 27 degrees of the diffusion angle. In other words, the incident light irradiated from a direction at an angle of 15 degrees from the normal line is diffused by about 27 degrees by the filter 14 for the liquid crystal display device.

In FIG. 1 showing the structure of the direct vision type liquid crystal display device to which the filter 14 comprising the light diffusing plate of the present invention is fitted, the light beam which passes through the polarizing plate 7 on the light emitting side is bent on the wider angle side when it passes through the filter 14 for the liquid crystal display device. The light beam emitted from the liquid crystal display device has a higher contrast as it is closer to the normal line direction to the liquid crystal display device. Then, as the emitted light near the normal line direction is diffused on the wider angle side, the contrast on the wider angle side is improved. When the emitted light is diffused, a light beam reaches the shadow areas caused by the opaque parts of the liquid crystal display device and makes the shadow imperceptible, whereby the image quality is improved.

In the case of the liquid crystal projector, the light source lamp unit is placed instead of the back light 1 in FIG. 1 and the projection screen is placed at the position of the viewer, whereby it is possible to decrease the shadow areas caused by the opaque parts. In this case, the light beam reaches the shadow areas caused by the opaque parts of the device and illuminates those areas by the light diffused by the filter for the liquid crystal display device, whereby the image quality is improved, as in the case of the direct vision liquid crystal display device.

Comparative Example

As a liquid crystal display device, a liquid crystal color TV set 4E-L1 manufactured by Sharp Corporation was used. Using a digital pattern generator MTSG-1000 manufacture by Sony Corporation, a window pattern was imaged on the face plane, and a white luminance in the white window and a black luminance in the black window were measured from the upper direction angle of 50 degrees to the lower direction angle of 60 degrees with a luminance meter LS-100 manufactured by Minolta Co., Ltd.

The maximum white luminance was 128.6 nt at the lower direction angle of 15 degrees. An angle of view in relation to the luminance was defined as an angle range in which the luminance was at least one third (⅓) of the maximum white luminance, that is, at least 42.9 nt. An angle of view in relation to the contrast was defined as an angle range in which a ratio of white luminance to black luminance was at least 5:1. Then, an angle range in which both the luminance and the contrast were satisfied was defined as an angle of view of the face plane of the liquid crystal TV set. The result is shown in Table 1.

Example 2

As a resinous composition for the light diffusing plate, there was used a photopolymerizable composition (40 parts) prepared by mixing a polyether urethane acrylate having an average molecular weight of about 6000 which was obtained by the reaction of polypropylene glycol, hexamethylene diisocyanate and 2-hydroxyethyl acrylate, 2,4,6-tribromophenyl acrylate (30 parts), 2-hydroxy-3-phenoxypropyl acrylate (30 parts), and 2-hydroxy-2-methylpropiophenone (1.5 parts) as a photopolymerization initiator.

Figure 7:
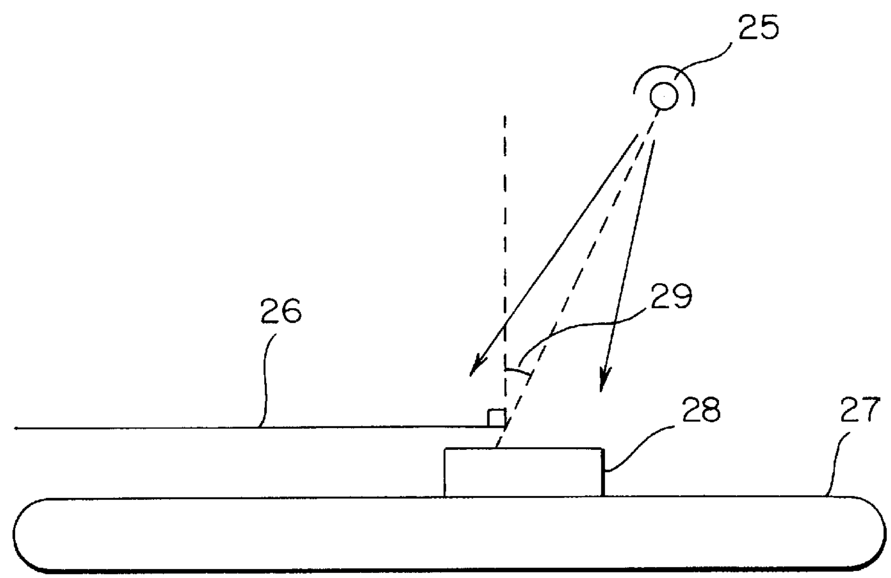
FIG. 7 is a cross sectional view showing a structure of a UV light irradiating apparatus.
Figure 8:
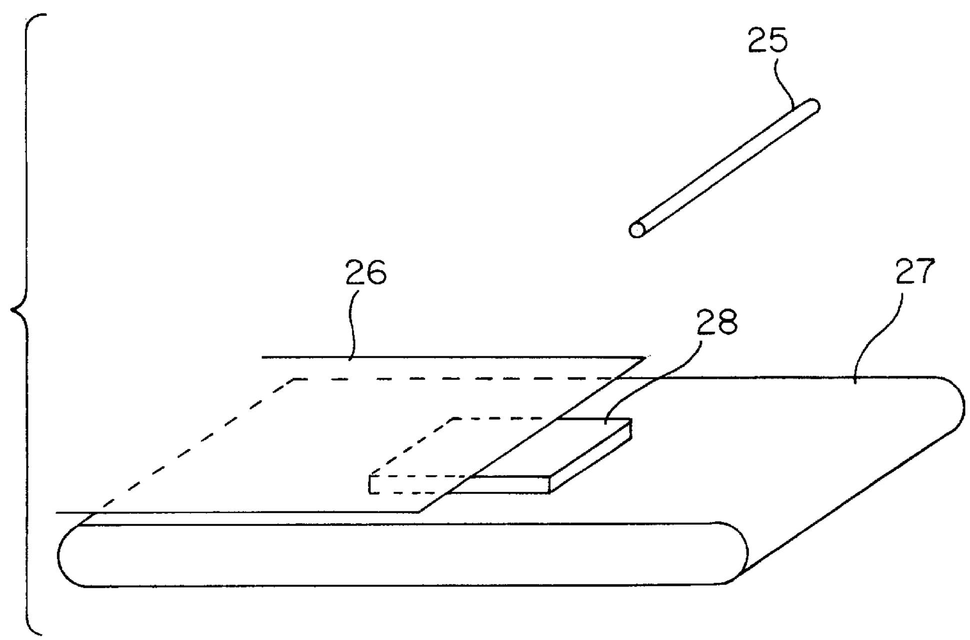
FIG. 8 is a perspective view schematically showing a UV light irradiating apparatus.

The resinous composition was coated on a PET film having a thickness of 188 μm and irradiated with a UV light at an irradiation angle of 17 degrees using an apparatus shown in FIGS. 7 and 8, to obtain a light diffusing plate having a thickness of 205 μm. In FIGS. 7 and 8, 25 stands for a rod-shape high pressure mercury lamp of 80 W/cm, 26 stands for a light shielding plate, 27 stands for a conveyor, 28 stands for the PET film having the thickness of 188 μm on which the resinous composition was coated, and 29 stands for the irradiation angle of the UV light used in this Example.

The maximum haze of the light diffusing plate and a diffusion angle range which was defined by the haze of at least 30% are shown in Table 2.

This light diffusing plate was fitted to the face plane of the liquid crystal TV set as used in the Comparative Example with arranging the light diffusion angle range in the lower direction angle range, and the same measurement as in the Comparative Example was carried out. The result are shown in Table 1.

Example 3

A light diffusing plate having a thickness of 205 μm was produced from the same resinous composition for the light diffusing plate as used in Example 2 by irradiating the composition at an irradiation angle of 22 degrees with the apparatus shown in FIGS. 7 and 8.

The maximum haze of the light diffusing plate and a diffusion angle range which was defined by the haze of at least 30% are shown in Table 2.

This light diffusing plate was fitted to the face plane of the liquid crystal TV set as used in the Comparative Example with arranging the light diffusion angle range in the lower direction angle range, and the same measurement as in the Comparative Example was carried out. The result are shown in Table 1.

Example 4

A light diffusing plate having a thickness of 205 μm was produced from the same resinous composition for the light diffusing plate as used in Example 2 by irradiating the composition at an irradiation angle of 27 degrees with the apparatus shown in FIGS. 7 and 8.

The maximum haze of the light diffusing plate and a diffusion angle range which was defined by the haze of at least 30% are shown in Table 2.

This light diffusing plate was fitted to the face plane of the liquid crystal TV set as used in the Comparative Example with arranging the light diffusion angle range in the lower direction angle range, and the same measurement as in the Comparative Example was carried out. The result are shown in Table 1.

Example 5

A light diffusing plate having a thickness of 205 μm was produced from the same resinous composition for the light diffusing plate as used in Example 2 by irradiating the composition at an irradiation angle of 31 degrees with the apparatus shown in FIGS. 7 and 8.

The maximum haze of the light diffusing plate and a diffusion angle range which was defined by the haze of at least 30% are shown in Table 2.

This light diffusing plate was fitted to the face plane of the liquid crystal TV set as used in the Comparative Example with arranging the light diffusion angle range in the lower direction angle range, and the same measurement as in the Comparative Example was carried out. The result are shown in Table 1.

Example 6

The light diffusing plate which was produced in Example 2 was fitted to the face plane of the liquid crystal TV set as used in the Comparative Example with arranging the light diffusion angle range in the upper direction angle range, and the same measurement as in the Comparative Example was carried out. The result are shown in Table 1.

Example 7

The light diffusing plate which was produced in Example 3 was fitted to the face plane of the liquid crystal TV set as used in the Comparative Example with arranging the light diffusion angle range in the upper direction angle range, and the same measurement as in the Comparative Example was carried out. The result are shown in Table 1.

Example 8

The light diffusing plate which was produced in Example 4 was fitted to the face plane of the liquid crystal TV set as used in the Comparative Example with arranging the light diffusion angle range in the upper direction angle range, and the same measurement as in the Comparative Example was carried out. The result are shown in Table 1.

Example 9

The light diffusing plate which was produced in Example 5 was fitted to the face plane of the liquid crystal TV set as used in the Comparative Example with arranging the light diffusion angle range in the lower direction angle range, further the light diffusing plate which was produced in Example 4 was fitted over the above light diffusing plate with arranging the light diffusion angle range in the upper direction angle range, and the same measurement as in the Comparative Example was carried out. The result are shown in Table 1.

TABLE 1

| | Angle of view | | |
|---|---|---|---|
| | Upper direction angle | Lower direction angle | Range of angle of view |
| Comp. Ex. | 32 degrees | 33 degrees | 65 degrees |
| Example 2 | 31 degrees | 41 degrees | 72 degrees |
| Example 3 | 32 degrees | 43 degrees | 75 degrees |
| Example 4 | 32 degrees | 52 degrees | 84 degrees |
| Exampie 5 | 32 degrees | 55 degrees | 87 degrees |
| Example 6 | 34 degrees | 34 degrees | 68 degrees |
| Example 7 | 37 degrees | 34 degrees | 71 degrees |
| Example 8 | 40 degrees | 33 degrees | 73 degrees |
| Example 9 | 40 degrees | 55 degrees | 95 degrees |

TABLE 2

| | Maximum haze | Diffusion angle range |
|---|---|---|
| Example 2 | 75% | 6 to 40 degrees |
| Example 3 | 74% | 10 to 44 degrees |
| Example 4 | 75% | 15 to 49 degrees |
| Example 5 | 75% | 20 to 54 degrees |

EFFECTS OF THE INVENTION

When the filter comprising the light diffusing plate of the present invention is used, the angle of view of the liquid crystal display face plane is widened, the shadows due to the opaque parts are reduced, and the Moiré fringe is hardly formed. The light diffusing plate of the present invention is easily produced.

What is claimed is:

1. A method for widening a view angle of a liquid crystal display device comprising fitting a filter to a liquid crystal display device, wherein said filter comprises a light diffusing plate which is obtained by shaping into a film a composition comprising at least two photopolymerizable oligomers or monomers having refractive indexes which differ by at least 0.01 and irradiating ultraviolet light on said film of the composition, wherein the polymerizable oligomers or monomers have acrylate functional groups.

2. The method according to claim 1, wherein said light diffusing plate has a domain gap of 1 to 20 μm.

3. The method according to claim 1, wherein said ultraviolet light is irradiated from a light source selected from the group consisting of a spherical light source, a box-shaped light source and a rod-shaped light source having a ratio of a long axis to a short axis of 2:1 or less.

4. The method according to claim 1, wherein said light diffusing plate has both a light incident angle range with a light diffusing ability for achieving a haze of at least 30% and a light incident angle range without a light diffusing ability.

5. The method according to claim 4, wherein said light diffusing plate is obtained by the irradiation of ultraviolet light from a linear or rod-shaped light source.

6. The method according to claim 4, wherein the maximum haze in the incident angle range in which the light diffusing plate has light diffusing ability is from 30 to 85%.

7. The method according to claim 4, wherein said light diffusing plate has a domain gap of 1 to 20 μm.

8. The method according to claim 4, wherein said filter has a thickness of between 10 and 300 μm.

9. The method according to claim 4, wherein the combination of the photopolymerizable monomers or oligomers is a combination of at least one component selected from the group consisting of 2,4,6-tribromophenyl acrylate, tribromophenoxyethyl acrylate, nonylphenoxyethyl acrylate, 2-hydroxy-3-phenoxypropyl acrylate, phenylcarbitol acrylate, phenoxyethyl acrylate, and ethylene oxide-modified bisphenol-A diepoxy acrylate; and at least one component selected from the group consisting of triethylene glycol diacrylate, polyethylene glycol diacrylate, neopentyl glycol diacrylate, 1,6-hexanediol diacrylate, polyol polyacrylate, modified polyol polyacrylate, polybutadiene acrylate, and polyether urethane acrylate.

10. The method according to claim 4, wherein the two photopolymerizable oligomers or monomers having different refractive indexes are present in a weight ratio of from 9:1 to 1:9.

11. The method according to claim 1, wherein said filter has a thickness of between 10 and 300 μm.

12. The method according to claim 1, wherein the combination of the photopolymerizable monomers or oligomers is a combination of at least one component selected from the group consisting of 2,4,6-tribromophenyl acrylate, tribromophenoxyethyl acrylate, nonylphenoxyethyl acrylate, 2-hydroxy-3-phenoxypropyl acrylate, phenylcarbitol acrylate, phenoxyethyl acrylate, and ethylene oxide-modified bisphenol-A diepoxy acrylate; and at least one component selected from the group consisting of triethylene glycol diacrylate, polyethylene glycol diacrylate, neopentyl glycol diacrylate, 1,6-hexanediol diacrylate, polyol polyacrylate, modified polyol polyacrylate, polybutadiene acrylate, and polyether urethane acrylate.

13. The method according to claim 1, wherein the two photopolymerizable oligomers or monomers having different refractive indexes are present in a weight ratio of from 9:1 to 1:9.

* * * * *